United States Patent [19]

Emilsson

[11] Patent Number: 4,575,159
[45] Date of Patent: Mar. 11, 1986

[54] RAIL VEHICLE BRAKE SYSTEM

[75] Inventor: Fred S. Emilsson, Trelleborg, Sweden

[73] Assignee: SAB Nife AB, Landskrona, Sweden

[21] Appl. No.: 622,175

[22] Filed: Jun. 19, 1984

[30] Foreign Application Priority Data

Jun. 22, 1983 [SE] Sweden .............................. 8303579

[51] Int. Cl.$^4$ ............................................. B60T 13/38
[52] U.S. Cl. .................................. 303/71; 303/6 M; 303/57
[58] Field of Search ...................... 303/6 M, 9, 40, 57, 303/58, 69, 71; 188/170

[56] References Cited

U.S. PATENT DOCUMENTS

| 3,295,422 | 1/1967 | Bostwick | 303/6 M X |
| 3,713,702 | 1/1973 | Campanini | 303/9 |
| 3,724,609 | 4/1973 | Kobald | 188/170 |
| 4,057,297 | 11/1977 | Beck et al. | 303/71 |

FOREIGN PATENT DOCUMENTS 223608  6/1910  Fed. Rep. of Germany .

Primary Examiner—Duane A. Reger
Attorney, Agent, or Firm—Laurence R. Brown

[57] ABSTRACT

This invention relates to a rail vehicle brake system comprising an air brake cylinder (10, 11) with a piston (12) which is spring-biased for brake application on one side thereof, and a control system for selectively supplying pressurized air to said cylinder.

On both sides of the piston (12) the air brake cylinder spaces (10, 11) are connected to a common control system (28, 31) for the supply of pressurized air thereto. The control system—by controlling the supply and discharge to and from the respective spaces—accomplishes a pressure differential between the spaces for service braking.

7 Claims, 8 Drawing Figures

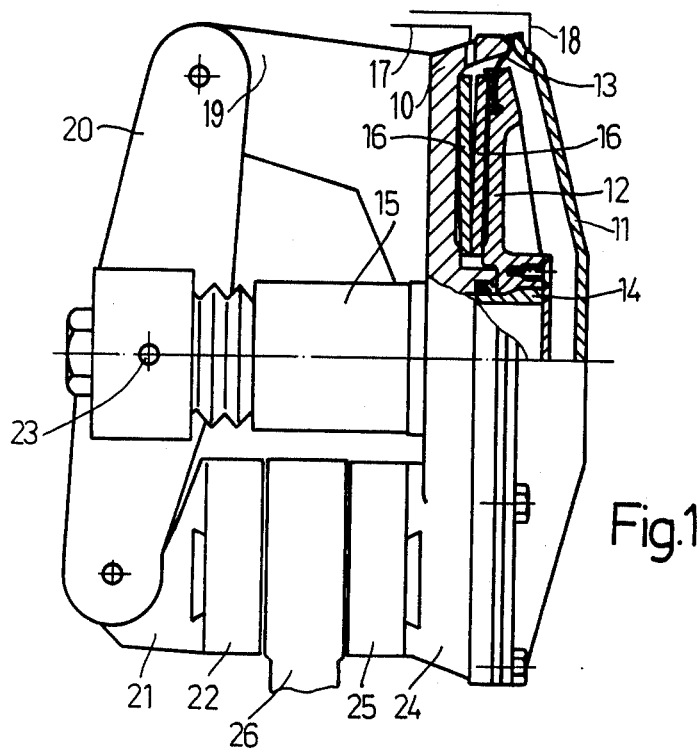
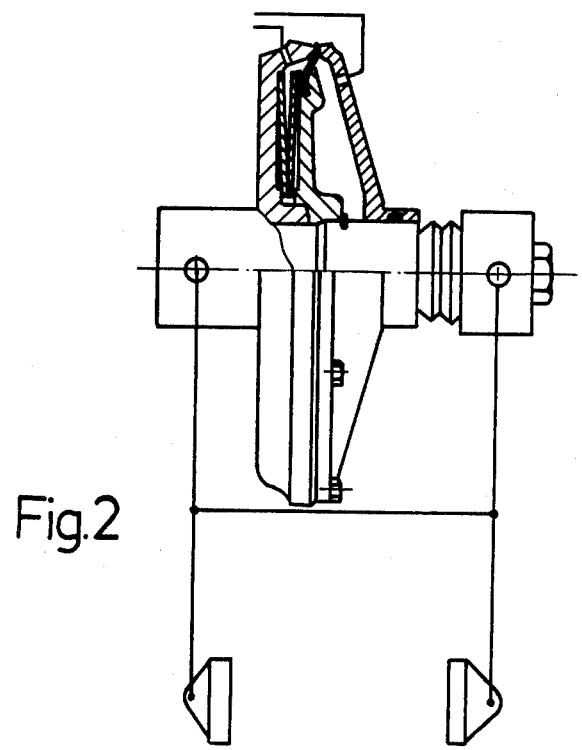
Fig.1
Fig.2

RAIL VEHICLE BRAKE SYSTEM

TECHNICAL FIELD

This invention relates to a rail vehicle brake system, comprising an air brake cylinder with a piston, which is spring-biased for brake application on one side thereof, and a control system for selectively supplying pressurized air from a supply thereof to spaces in said cylinder on both sides of the piston.

BACKGROUND ART

In a conventional air brake system the braking force is obtained by supplying pressurized air to the brake cylinder at one side of the piston therein. The brake is released by discharging the air from the cylinder, the air thus being lost.

In a known modification of this brake the braking force is obtained by means of a very heavy pretensioned spring, which acts on one side of the piston, the brake being released by the supply of pressurized air on the opposite sides of the piston. When the brake is to be applied again, also in this case air has to be discharged and will be lost.

DISCLOSURE OF INVENTION

The purpose of the invention is to provide a new and for many uses advantageous rail vehicle brake system, which reduces the losses of pressurized air at the brake operation and which provides a high-speed operation and can be of reduced size as compared with prior art brake systems particularly as far as the air brake cylinder is concerned. The high-speed operation is especially useful—together with the reduced air consumption—in systems with anti-skid function, where applications releases can occur with high frequency.

For said purpose the invention provides a rail vehicle brake system of the type referred to above, which is characterized in that a control system common for said two spaces—by selectively controlling the supply and discharge of pressurized air to and from, respectively, said brake cylinder spaces—is arranged to accomplish a continuously or stepwise controllable pressure differential between said spaces for service braking or for parking braking under the influence of the spring bias only.

This brake system according to the invention will be referred to below as a differential brake.

BRIEF DESCRIPTION OF THE DRAWINGS

The invention will be described in more detail below with reference to the accompanying drawings in which FIG. 1 is a side view, partly in axial cross-section, of one embodiment of a differential brake unit for use in a system according to the invention, FIG. 2 is a partly sectional view of a modification of the brake unit in FIG. 1.

DESCRIPTION OF PREFERRED EMBODIMENTS

Figure 3:
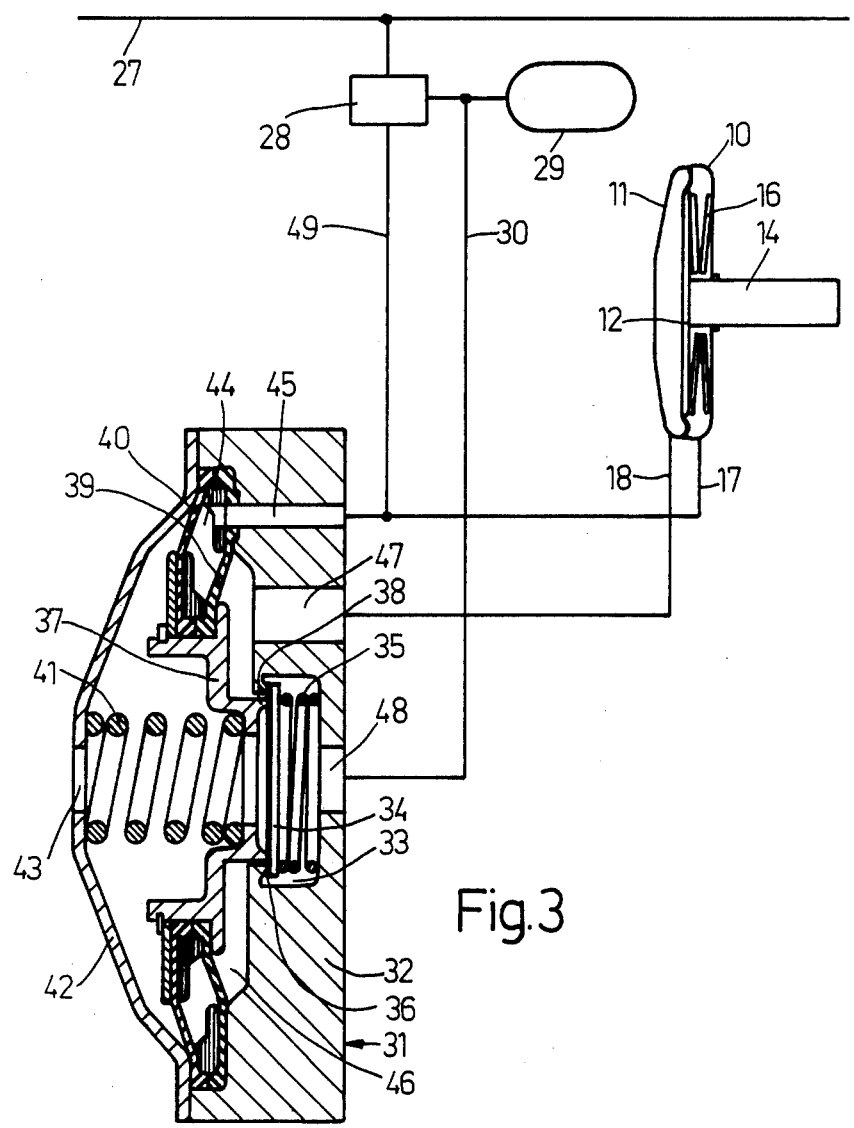
FIG. 3 is a diagrammatic view of a differential brake system of the invention including a differential valve shown in axial cross-sectional view.

Referring to FIG. 1, the differential brake unit shown therein includes an air brake cylinder comprising a cylinder housing 10 with a bolted-on lid 11, and a piston 12. An annular diaphragm 13 is attached to the piston 12 and is clamped between the cylinder housing 10 and the lid 11. The piston is connected to a piston rod 14, which in turn is connected to a conventional slack adjuster of pulling type, per se forming no part of the invention, the housing 15 of which is connected to the cylinder housing 10 and preferably is integral therewith. Two cup springs 16 are arranged between the cylinder housing 10 and the piston 12 on one side thereof, air conduits 17 and 18, respectively, being connected to the cylinder spaces on said one side of the piston and the opposite side of the piston.

A bracket 19 projects from the cylinder housing 10 and preferably is integral therewith, and a brake lever 20 is pivoted to said bracket at one end thereof. The opposite end of the brake lever 20 is provided with a pivotal brake pad holder 21 having a replaceable brake pad 22. The slack adjuster is pivotally connected to the brake lever 20 at an intermediate point at 23. The cylinder housing 10 forms a second brake pad holder 24 having a replaceable brake pad 25.

The brake unit thus described is suspended from an underframe or bogie of a rail vehicle in a manner well known in the art by means not shown in the drawing, with the brake pads 22 and 25 located one at each side of a disc, fragmentarily shown at 26 and connected to a wheel shaft to be braked.

The springs 16 are effective to bias the piston 12 to the right as seen in the drawing forcing the brake lever 20 to swing in the counter-clockwise direction around the pivot thereof on the bracket 19, so that the brake pads 22 and 25 will be applied against the disc 26. Due to the existence of the slack adjuster the slack between the brake pads 22 and 25 and the disc 26 will always be held at the proper value irrespective of the wear of the brake pads 22 and 25. Accordingly a limited movement only of the piston 12 will be necessary for application of the brake.

Provided that no air pressure is maintained in the cylinder space on the right side of the piston 12, conduit 18 being connected to the atmosphere, the differential brake unit accordingly is applied by the force of the springs 16. The braking force can be increased by supplying pressurized air through the conduit 17 to the cylinder space on the left side of the piston 12, and the brake will be released if the conduit 17 is vented to the atmosphere and pressurized air is supplied to the cylinder space on the right side of the piston 12 through the conduit 18 against the spring bias.

As will be seen, the differential brake unit operates as a parking brake by the braking force applied by the springs 16, when no pressurized air is supplied through conduits 17 and 18.

Figure 6:
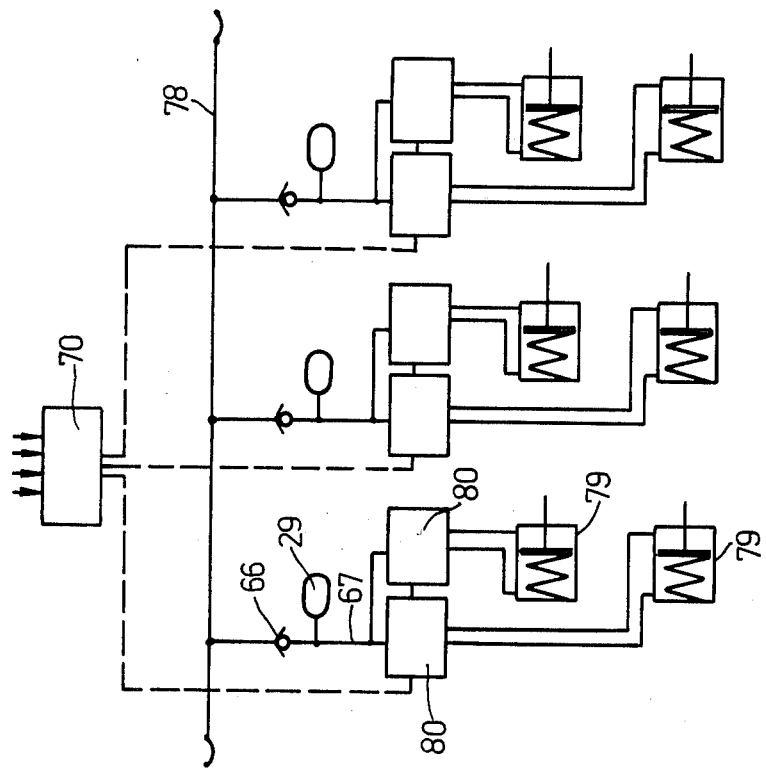
FIG. 6 is a diagrammatic view of a further embodiment of the brake system.
Figure 7:
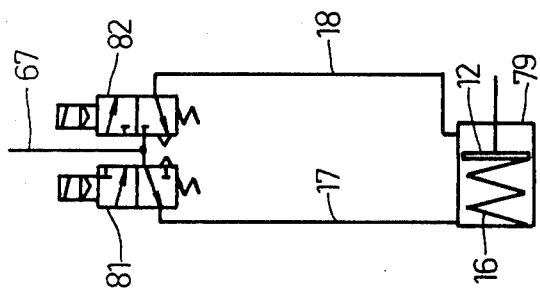
FIGS. 7 and 8 are diagrammatic detail views of two embodiments of the brake control valve arrangement in the system of FIG. 6.
Figure 8:
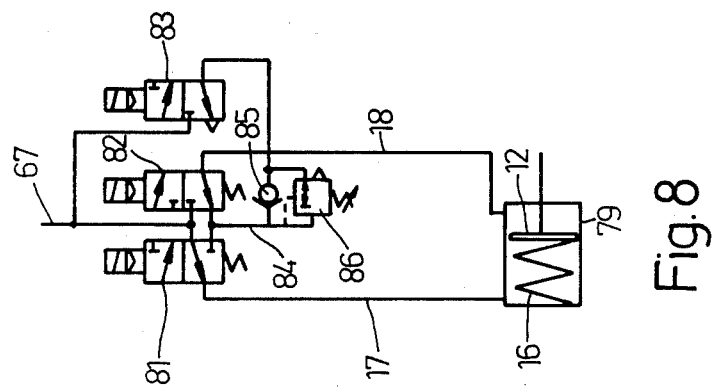

FIG. 2, having no reference numerals as the design and function of the unit shown therein is clear for any person skilled in the art, shows a pushing actuator of the same general type as the pulling unit according to FIG. 1. Also a tread brake unit or actuator of the spring brake type may be used in a differential system of the invention. In the examples presented below under reference to FIGS. 3-5 the actuator is of the pulling type, whereas FIGS. 6-8 show pushing actuators.

Referring now to FIG. 3, the differential brake system disclosed therein is connected to a brake air conduit 27 extending through a rail vehicle. This conduit is for the supply of pressurized air to the brake system, and normally a predetermined pressure is maintained therein. When braking is to be initiated the pressure of the pressurized air in the conduit 27 is decreased by the driver's brake control valve being operated.

A relay valve 28 of a known type and forming no part of the present invention is connected to conduit 27, and under normal conditions (no braking) the relay valve connects conduit 27 to an air reservoir 29, which can comprise an auxiliary reservoir and an emergency reservoir as is known in the art. The relay valve also connects conduit 27 with a conduit 30 permanently connected to the reservoir 29 and extending to a differential valve 31.

The differential valve 31 comprises a valve housing 32, which forms a central cavity 33 having a valve disc 34 biased by a helical pressure spring 35 against a seat 36 formed by the valve housing. A piston 36 forms a seat 38 and is held with this seat positioned substantially concentrically in the opening surrounded by the seat 36 by means of annular diaphragms 39 and 40, clamped to the valve housing 32 at the outer periphery thereof and to the piston 37 at the inner periphery thereof. The piston 37 is biased by a helical pressure spring 41 towards the valve disc 34, the spring being engaged between the piston and a cover 42 attached to the valve housing 32 and covering the piston 37 and the diaphragms 39 and 40. The cover has a central opening 43, through which the space defined between the valve housing 32 and the cover 42 is vented to the atmosphere.

Diaphragms 39 and 40 define an annular closed space 44 which communicates with a passage 45 in the valve housing 32, and a space 46 defined between the piston 37 and the valve housing 32 communicates with a passage 47 in the valve housing 32. Finally, there is provided in the valve housing 32 a third passage 48 communicating with the cavity 33. Conduit 30 is connected to this latter passage 48, while passages 45 and 47 are connected to conduits 17 and 18, respectively, mentioned above in connection with the description of the differential brake unit disclosed in FIG. 1.

A conduit 49 extends between relay valve 28 and conduit 17. Normally, conduit 49 is vented to the atmosphere at relay valve 28, but when the pressure in conduit 27 is decreased, conduit 49 will be connected to reservoir 29, the communication between the reservoir and conduit 30 at one hand and conduit 27 at the other hand being interrupted.

When the pressure of the air in conduit 27 is at maximum, the brake is released. In this operational condition of the differential brake system, the reservoir 29 is connected to conduit 27, and this conduit and the reservoir are connected through conduit 30 and passage 48 to the cavity 33. The valve disc 34 in this cavity is engaged by the piston 37 and is held in a position in which it is lifted from the seat 36 under the bias of the spring 41, which is stronger than the spring 35. Thus, pressurized air at maximum pressure will be supplied from cavity 33 to passage 47 and then through conduit 18 to the brake cylinder 11 on the side of the piston 12 therein which is opposite to the cup springs 16. Since the cylinder space on the side of the piston, where the cup springs 16 are arranged, is at zero pressure, conduit 49 being vented to the atmosphere through relay valve 28, the brake unit will be moved to the released position. The pressure of the pressurized air acts on the piston 37 in the space 46 against the bias of the spring 41, and at a predetermined pressure, which is lower than the maximum pressure of the pressurized air and preferably exerts on piston 12 a force which equals the force exerted on the piston by the cup springs 16, the piston 37 will have been displaced against the bias of the spring 41, such that the valve disc 34 rests again against the seat 36 and thus interrupts further supply of pressurized air to the brake cylinder.

It is now assumed that the brake is to be applied by service pressure. Then, the pressure of the pressurized air in conduit 27 is decreased to a predetermined value, at which the relay valve 28 will be adjusted to the position in which reservoir 29 and conduit 30 are disconnected from conduit 27 and conduit 49 is connected to reservoir 29 in parallel with conduit 30. However, the pressure in conduit 49 will not be at the same value as the pressure in reservoir 29, which equals the maximum pressure maintained in conduit 27. Relay valve 28 is of the type well known in the art, which supplies to conduit 49 a pressure which is inversely proportional to the decrease of the pressure in conduit 27. Thus (and somewhat simplified), if the brake regulating part of the pressure in conduit 27 is decreased by for example 20%, the pressure in conduit 49 will be increased from zero to a pressure which equals 20% of the pressure in the reservoir 29. This means that the pressurized air now acts on the piston 37 not only in the space 46 but also in the space 44 defined between the diaphragms 39 and 40, pressurized air being supplied to space 44 through passage 45. Under the pressure acting thereon the piston 37 will be lifted from valve disc 34, engaging seat 36, against the bias of spring 41 such that space 46 and accordingly passage 47 and conduit 18 will be vented to the atmosphere through opening 43. Pressurized air will be supplied at the pressure determined by the pressure decrease in conduit 27 from reservoir 29 to the space in the brake cylinder 11 where the cup springs 16 are arranged, while the cylinder space on the opposite side of piston 12 will be connected to the atmosphere. Accordingly, the brake will be applied under the bias of cup springs 16.

When the piston 12 is displaced to the left as seen in FIG. 3 under the bias of cup springs 16, the cylinder space on the side of the piston which is opposite to the cup springs will be vented to the atmosphere through conduit 18, passage 47, space 46, and opening 43, until the force on the piston 37 exerted by the pressure in spaces 44 and 46 corresponds to the force exerted thereon by the spring 41, at which time the connection for venting the cylinder space on the side of the piston 12, which is opposite to the cup springs 16, through conduit 18 will be interrupted due to the fact that the piston 37 will engage the valve disc 34, which is firmly held against the seat 36 under the pressure of the pressurized air in the reservoir 29. The braking force will be determined by the pressure decrease in conduit 27, and (again somewhat simplified) if this decrease is 20% as was assumed above, 20% of the maximum braking force will be applied.

The piston 37 is stabilized, i.e. the valve disc 34 is in engagement with the two seats 36 and 38, when the force exerted on the piston 37 by the pressures in space 44 (brake pressure) and in space 46 (differential pressure) equals the force of the spring 41.

The braking force can be increased to a maximum value by continuously decreasing the pressure in conduit 27. The maximum service braking pressure can be adjusted in relation to the emergency braking pressure by arranging different relationships between the pressure area of the piston 37 in the space 46 and the pressure area of said piston in the space 44 and by adjusting the force of the spring 41.

Correspondingly, the share in the total brake force of the force from the cup springs 16 can be increased if the relationships are so chosen that at maximum braking force a reduced pressure is maintained on the side of the piston 12 which is opposite the cup springs 16.

Figure 4:
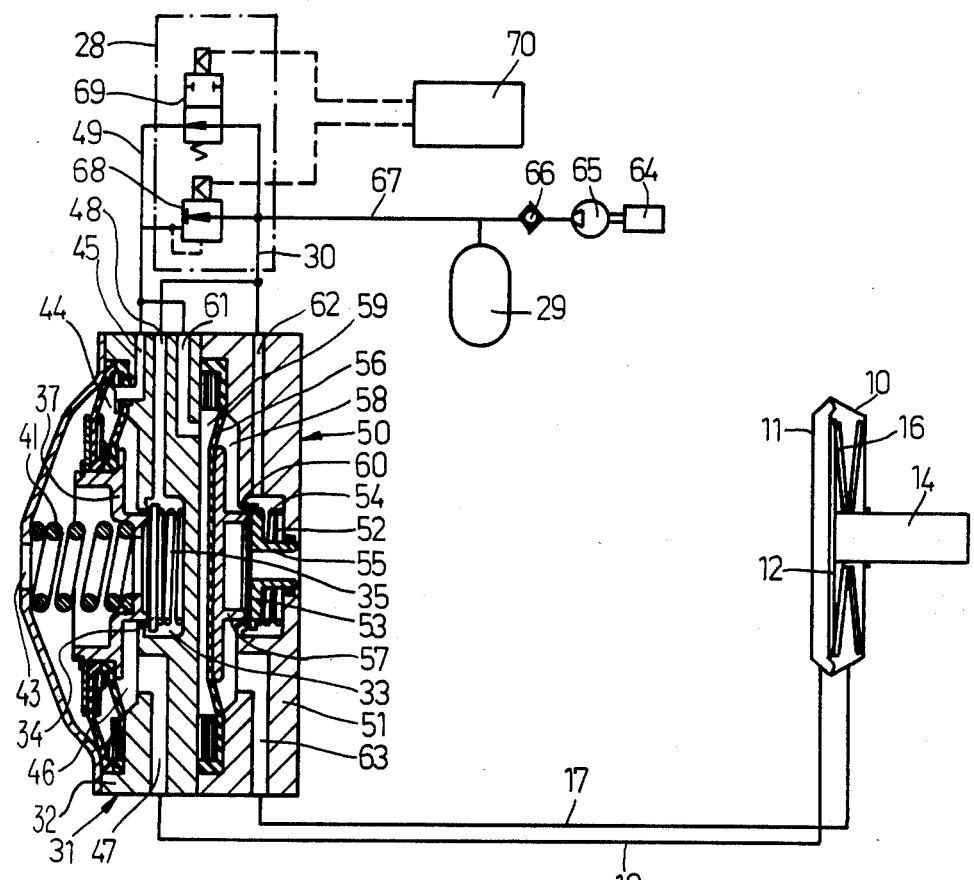
FIG. 4 is a diagrammatic view of a differential brake system, similar to that in FIG. 3, wherein the differential valve is combined with an amplifier valve.

Referring now to FIG. 4, the differential valve 31 in the differential brake system disclosed therein is combined with an amplifier valve 50. This valve comprises a valve housing 51, which forms a cavity 52 with a valve disc 53 mounted therein and biased by a spring 54. The valve disc has a hollow valve rod 55 forming a through passage opening into the atmosphere. A diaphragm 56 is clamped in the housing at the periphery thereof and has a seat 57 at the side of the diaphragm facing the valve disc 53. A space 58 is defined in the valve housing 51 at said side of the diaphragm 56, and at the opposite side of the diaphragm a space 59 is defined between the valve housing 51 of the amplifier valve 50 and the valve housing 32 of the differential valve 31, said valve housings being attached to one another. The valve disc 53 is engaged with a seat 60, formed by the valve housing 51, under the bias of the spring 54, and also the seat 57 concentrical with the seat 60 is arranged to co-operate with the valve disc 53.

Conduit 49 connected to passage 45 of the differential valve 31 is connected also to a passage 61 provided in the valve housing 32 and communicating with space 59 of the amplifier valve 50, and conduit 30 connected to passage 48 of the differential valve 31 is connected also to a passage 62 in the valve housing 51 of the amplifier valve 50, said passage 62 communicating with the cavity 52. The space 58 in valve housing 51 is connected by a passage 63 to conduit 17, communicating with the space in the air brake cylinder wherein the cup springs 16 are arranged, while the space on the opposite side of the piston 12 of the air brake cylinder communicates through conduit 18 with passage 47 in the valve housing 32 of the differential valve 31 as shown also in FIG. 3.

The brake system of FIG. 4 comprises a motor 64 driving an air compressor 65, which supplies pressurized air to the reservoir 29 via a check valve 66 (but a traditional brake air supply system as in FIG. 3 may alternatively be used). A conduit 67 connects the reservoir 29 with relay valve 28 which in FIG. 4 is shown to include a control valve 68 for continuous braking and a valve 69 for emergency braking. These valves are solenoid-type valves, whose solenoids are connected to an electronic control unit 70 of a type known in the art. This unit is operatively connected to a manually operated brake control and to automatic means for anti-skid, etc.

When the valve 68 is de-energized it is in the position shown in FIG. 4, connecting conduits 67 and 49 with each other. However, when the brake is released the valve 68 is energized so as to be adjusted to its other position, in which the connection between conduits 67 and 49 is interrupted and space 44 of differential valve 31 and space 59 of amplifier valve 50 are vented to the atmosphere. Reservoir 29 is connected through conduits 67 and 30 and passage 48 to the cavity 33 of the differential valve 31 and through conduits 67 and 30 and passage 62 to the cavity 52 of the amplifier valve 50. Accordingly, the differential valve 31 will be adjusted for the supply of pressurized air at maximum pressure through conduit 18 to the brake cylinder on the side of the piston 12 therein which is opposite to the cup springs 16 in the manner described with reference to FIG. 3. Moreover, the pressurized air in the cavity 52 of the amplifier valve 50 will hold the valve disc 53 against the seat 60, so that the connection between the cavity 52 and the space 58 is interrupted. Thus, the brake cylinder on the side of the piston 12 on which the cup springs 16 are provided will be vented through conduit 17, passage 63, space 58 and the passage of the hollow rod 55 to the atmosphere, the diaphragm seat 57 being lifted from the valve disc 53. As will be understood, the brake unit will be adjusted to the released position as described previously with reference to FIG. 3.

If it is assumed that the brake is to be applied by service pressure, the valve 28 is operated, and accordingly conduit 67 will be connected to conduit 49. In this case the pressure of the pressurized air in the conduit 49 and the space 44 of the differential valve adjusted as described with reference to FIG. 3 will not act directly in the brake cylinder 10 on the side of the piston 12 where the cup springs 16 are arranged. This pressure will instead be transferred through passage 61 to the space 59 of the amplifier valve 50, where it will act on the movable seat 57, which will be pressed against the valve disc 53. Accordingly, the valve disc will be lifted from the seat 60 against the bias of the spring 54, so that pressurized air at the maximum pressure can pass from the reservoir 29 through the conduit 67, the conduit 30, the passage 62, the space 58, the passage 63, and the conduit 17 to the brake cylinder on the side of the piston 12, where the cup springs 16 are arranged.

The pressure supplied to said space in the brake cylinder will be stabilized at a value determined by the pressure established in conduit 49 by the adjustment of the valve 69, the valve disc 53 being engaged with the seat 60 under the force applied by the spring 54 and the air pressure in the cavity 58 against the force exerted on the valve disc by the pressurized air in the space 59 over the movable seat 57. The pressure in the brake cylinder 10 is proportionally reduced through conduit 18 via the differential valve in the same manner as described previously with reference to FIG. 3.

The embodiment of FIG. 4 provides the advantage that the valve 58 can be of a simple construction and can have small dimensions due to the fact that the supply of pressurized air to the brake cylinder is accomplished by means of the amplifier valve 50.

Emergency braking is effected by de-energizing the valve 69 so as to provide a direct connection between the reservoir 29 and the conduit 49 in order to raise to the maximum value the pressure in the brake cylinder on the side of the piston 12 where the cup springs 16 are provided.

Figure 5:
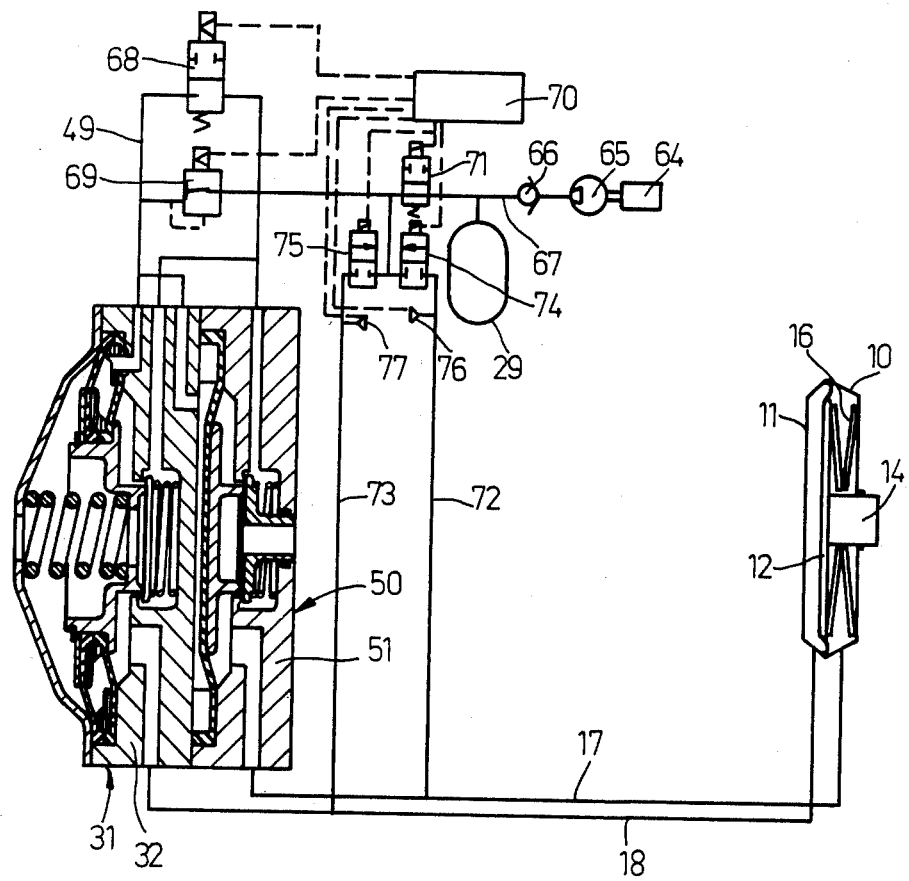
FIG. 5 is a diagrammatic view similar to FIG. 4 and showing a modification of the brake system shown in FIG. 4.

FIG. 5 shows the same brake system as that shown in FIG. 4 but with an arrangement for reducing the air consumption in the brake system and thus reducing the energy consumption in the system. With reference to FIG. 5 there is provided in conduit 67 a solenoid valve 71 operatively connected to the electronic control unit 70. When de-energized this valve is open; it will be closed when energized. Conduits 72 and 73 are connected to conduits 17 and 18, respectively. Also these valves are operatively connected to the electronic control unit 70, and they are in the closed position when de-energized. They will be adjusted to the open position when energized under the control of the control unit 70.

When the brake is in the released position, the solenoid valves 71, 74, and 75 are in the de-energized position as shown in FIG. 5. When the brake is to be applied in the manner described with reference to FIG. 5, solenoid valves 71 and 75 will be energized so as to interrupt the supply of pressurized air from the reservoir 29 and to connect the brake cylinder on the side of the piston 12 which is opposite to the cup springs 16 via valve 75 with conduit 67, so that the pressurized air expelled from the cylinder on said side of the piston 12 will be supplied to the brake cylinder on the side of the piston 12, where the cup springs 16 are arranged, under the control of the differential valve 31 and the amplifier valve 50 in the manner described with reference to FIG. 4. Sensors 76 and 77 sensing the pressure in the brake cylinder on opposite sides of the piston 12 supply signals to the electronic control unit 70, which are proportional to said pressures, and at a predetermined lower value of the difference between the pressures indicated by the sensors, the electronic unit de-energizes valves 71 and 75 for the supply of pressurized air to the brake cylinder from the reservoir 29 during the final phase of the operation for applying the brake in the manner described with reference to FIG. 4.

When the brake is to be released solenoid valves 71 and 74 will be energized under the control of the electronic control unit 70, so that pressurized air will be transferred from the space of the brake cylinder where the cup springs 16 are arranged to the opposite side of the piston 12 via the solenoid valve 74 in a manner analogous to that described with reference to the application of the brake, and also in this case valves 71 and 74 will be de-energized at a predetermined lower pressure difference between the pressures indicated by the sensors 76 and 77 for the supply of pressurized air from the reservoir 29 during the final phase of the operation for releasing the brake.

By the arrangement described with reference to FIG. 5 a considerable reduction of the consumption of pressurized air will be obtained, and it is estimated that only about 30% of the pressurized air supplied in a conventional spring brake system will be consumed in the brake system shown in FIG. 5.

Another important advantage with an arrangement of this kind is the improved possibility to obtain fast and efficient anti-skid function also with reduced air consumption. This advantage is likewise inherent in the systems according to FIGS. 6-8 described below.

The brake system of FIG. 6, to which reference now is made, is of the step control type contrary to the systems of the continuous control type previously described herein. To a conduit 78 for pressurized air three brake systems are connected, associated e.g. one to each bogie of a rail vehicle. Each brake system comprises a reservoir 29 connected to conduit 78 via a check valve 66. The reservoir is connected through a conduit 67 to two brake units of the same general type as previously described herein and generally indicated at 79 over a brake control valve 80. This valve is operatively connected to an electronic control unit 70, which can be of a type well-known in the art and to which control signals are supplied, such as a brake command signal, an emergency brake signal, a skid indication signal, a load weight signal, etc.

In a two-step control embodiment the brake control valve 80 is arranged as shown in FIG. 7 and comprises two solenoid valves 81 and 82. Both valves are shown in a de-energized condition in FIG. 7. In this condition valve 81 connects conduit 67 through conduit 17 with the brake cylinder 79 at the side of the piston 12 therein on which the cup springs 16 are arranged, while the other valve 82 vents the cylinder space on the opposite side of the piston 12 to the atmosphere through conduit 18. In the energized position of said valves valve 81 vents the associated brake cylinder space to the atmosphere, while valve 82 connects the associated brake cylinder space with conduit 67.

When the brake is released, both valves 81 and 82 are energized, and accordingly the cylinder space wherein the cup springs 16 are arranged is vented to the atmosphere, and the cylinder space on the opposite side of the piston 12 is under the maximum pressure maintained in the reservoir 29. The brake can be partly applied by de-energizing valve 81, so that the brake cylinder spaces on opposite sides of the piston 12 both will be connected to the maximum air pressure. The brake is fully applied by de-energizing both valves 81 and 82—the condition shown in FIG. 7—wherein the brake cylinder space associated with valve 81 is still under maximum pressure, while the opposite cylinder space is vented to the atmosphere.

Any number of brake control steps can be arranged, and in FIG. 8 there is shown an arrangement with four steps. In this case valves 81 and 82 have no connection for venting conduits 17 and 18 to the atmosphere, a third solenoid valve 83 being provided for this purpose. In the de-energized position shown in FIG. 8 valve 81 connects conduit 67 to conduit 17, and in the energized position this valve connects conduit 17 to a conduit 84. This conduit is connected via a check valve 85 and a pressure reduction valve 86 to the valve 83, which in the de-energized position shown vents conduit 84 via the check valve 85 to the atmosphere.

In the de-energized position shown in FIG. 8 valve 82 vents conduit 18 via conduit 84 and check valve 85 to the atmosphere via valve 83, and when valve 82 is energized conduit 18 is connected to conduit 67. Valve 83 when energized connects conduit 84 via the pressure reduction valve 86 to conduit 67 and then, depending on the operational condition of valve 81 and 82, respectively, conduit 17 and 18, respectively, will be connected to conduit 67 via pressure reduction valve 86 and valve 83. In this case it is assumed that the pressure reduction valve 86 reduces the pressure maintained in conduit 67 by 50%.

When the brake is released, valves 81 and 82 are energized while valve 83 is de-energized, and accordingly the maximum pressure maintained in reservoir 29 is supplied through conduit 18 to the space in the brake cylinder 79 which is opposite to the cup springs 16, while the space containing the cup springs is vented to the atmosphere via check valve 85 and valve 83.

In a first braking step valves 81, 82, and 83 are all energized, which means that maximum pressure is supplied through conduit 18, while half the maximum pressure is supplied through conduit 17 via the reduction valve 86. This step corresponds to ¼ of the maximum braking effect.

In a second step valve 82 only is energized, and maximum pressure is supplied through both conduits 17 and 18, which corresponds to ½ of the maximum braking effect.

In a third step valve 83 only is energized, and accordingly the maximum pressure is supplied through conduit 17, while the pressure which is reduced by 50% is supplied through conduit 18. This condition corresponds to ¾ of the maximum braking effect.

In a fourth and last step no solenoid valve is energized, and this condition corresponds to that disclosed in FIG. 8. Maximum pressure is supplied through conduit 17, while conduit 18 is vented to the atmosphere via check 85 and valve 83. This corresponds to fully applied brake.

I claim:

1. A rail vehicle service brake system, comprising in combination, an air brake cylinder with a piston which is spring-biased for brake application on one side thereof, and a service brake control system including control means for selectively supplying variably controlled pressurized air from a service braking line in response to service braking control signals to spaces in said cylinder on both sides of the piston, said means being commonly connected to said two spaces for selectively controlling the supply and discharge of pressurized air to and from, respectively, said brake cylinder spaces by the variably controlled pressure in said service braking line, and service brake control means to accomplish a controllable pressure differential of variable pressure magnitudes responsive to normal service braking signals between said spaces for braking under the influence of the spring bias as modified by said controllable pressure differential.

2. A brake system as claimed in claim 1, characterized in that said control means comprises a valve connected to the brake cylinder spaces on opposite sides of the piston comprising a valve element to be actuated by the variable pressure of pressurized air from the service brake control signals for controlling correspondingly a variable pressure of pressurized air in the brake cylinder space opposed to said spring bias from said braking signals.

3. A brake system as claimed in claim 1, wherein said control means comprises valve means for interconnecting the brake cylinder spaces on opposite sides of the piston to transfer air therebetween in response to the braking signals to thereby reduce discharge of air from the system.

4. A brake system as claimed in claim 1, characterized by valve means for stepwise controlling the pressure of pressurized air in the brake cylinder spaces on opposite sides of the piston in response to the braking signals to vary the braking pressure produced by the spring biased piston.

5. A brake system as defined in claim 1 including means for supplying a continuously controllable pressure differential between said spaces.

6. A brake system as defined in claim 1 including means for supplying step by step controllable pressure differential between said spaces during brake release.

7. A brake system as defined in claim 1 including means for controlling the release of pressurized air discharged from the piston when braking to permit only partial release thereof.

* * * * *